United States Patent
Huang et al.

(10) Patent No.: US 11,832,754 B2
(45) Date of Patent: Dec. 5, 2023

(54) CONTAINER LID STRUCTURE AND LID STRUCTURE FOR PREPARING BEVERAGE

(71) Applicant: Chang Yang Material Co., LTD., Changhua County (TW)

(72) Inventors: Ming Hua Huang, Changhua County (TW); Lung Hsun Song, Changhua County (TW); Yun Ju Wu, Changhua County (TW); Hung Yu Hsieh, Changhua County (TW); Lin Chun Sun, Changhua County (TW)

(73) Assignee: CHANG YANG MATERIAL CO., LTD., Changhua County (TW)

( * ) Notice: Subject to any disclaimer, the term of this patent is extended or adjusted under 35 U.S.C. 154(b) by 758 days.

(21) Appl. No.: 16/789,136

(22) Filed: Feb. 12, 2020

(65) Prior Publication Data
US 2020/0268191 A1 Aug. 27, 2020

(30) Foreign Application Priority Data
Feb. 26, 2019 (TW) .................. 108202430

(51) Int. Cl.
| | | |
|---|---|---|
| *A47J 31/06* | (2006.01) |
| *B65D 43/02* | (2006.01) |
| *A47J 19/00* | (2006.01) |
| *A47J 31/44* | (2006.01) |
| *B65D 47/24* | (2006.01) |
| *B65D 47/04* | (2006.01) |

(52) U.S. Cl.
CPC ......... *A47J 31/0636* (2013.01); *A47J 19/005* (2013.01); *A47J 31/4407* (2013.01); *B65D 43/0202* (2013.01); *B65D 47/248* (2013.01); *B65D 47/043* (2013.01); *B65D 2231/025* (2013.01)

(58) Field of Classification Search
CPC .. A47J 31/0636; A47J 19/005; A47J 31/4407; A47J 36/08; B65D 43/0202; B65D 47/248; B65D 47/043; B65D 2231/025
See application file for complete search history.

(56) References Cited

U.S. PATENT DOCUMENTS 2,946,491 A * 7/1960 Bramming ........... B65D 47/246
  222/545
6,202,877 B1 * 3/2001 La Torre ............ A47G 19/2272
  220/254.1

* cited by examiner

*Primary Examiner* — Hung D Nguyen
(74) *Attorney, Agent, or Firm* — SHEPPARD MULLIN RICHTER & HAMPTON LLP (57) ABSTRACT

A lid structure, which is used for covering an opening of a container, includes a mainbody, an elastic annular element, and a covering assembly. The mainbody includes a through hole. The elastic annular element is integrally disposed on a peripheral region of the mainbody, wherein the elastic annular element is used for positioning the lid structure on the opening. The covering assembly is disposed on the mainbody and includes a spacer element and a covering element. The spacer element is disposed on and covers the through hole. The spacer element includes a plurality of drain holes and a central connecting portion. The covering element is deformably disposed on the central connecting portion.

10 Claims, 8 Drawing Sheets

CONTAINER LID STRUCTURE AND LID STRUCTURE FOR PREPARING BEVERAGE

RELATED APPLICATIONS

This application claims priority to Taiwan Patent Application Serial Number 108202430, filed Feb. 26, 2019, which is herein incorporated by reference in its entirety.

BACKGROUND

Technical Field

The present disclosure relates to a lid structure and a lid structure for preparing a beverage. More particularly, the present disclosure relates to a multifunctional lid structure and a multifunctional lid structure for preparing a beverage which can be detached quickly and can be applied to containers with different opening sizes.

Description of Related Art

Containers, such as bottles, cans, cups, bowels, dishes, etc., have openings, for placing solid or liquid items, such as foods or beverages therein. Lids with proper sizes are then used with the containers so as to seal the openings. It is favorable to prevent the items contained in the containers from falling or spilling. However, a conventional lid is often designed in combination with a container such as a cup or can having a specific opening size or can only be coupled to the container. Thus, the conventional lid cannot be widely applicable to the containers having different opening sizes.

Furthermore, in order to prevent the items contained in the container from falling or spilling, a lid which is attached to the opening of the container in a threaded manner is known in the market. However, when the aforementioned lid is opened, it is necessary to apply force to the container and the lid with both hands so as to separate the lid from the container with torque force. Thus, not only a user needs to apply a great force to separate the lid from the container, but also the items contained therein cannot be released when the lid and the container are connected together. Therefore, the use of the aforementioned lid is not convenient.

Therefore, how to provide a lid structure, which can be detached quickly and can be applied to containers with different opening sizes, has become a technical task with a commercial value.

SUMMARY

According to one aspect of the present disclosure, a lid structure, which is used for covering an opening of a container, includes a mainbody, an elastic annular element and a covering assembly. The mainbody includes a through hole. The elastic annular element is integrally disposed on a peripheral region of the mainbody, wherein the elastic annular element is used for positioning the lid structure on the opening. The covering assembly is disposed on the mainbody and includes a spacer element and a covering element. The spacer element is disposed on and covers the through hole, wherein the spacer element includes a plurality of drain holes and a central connecting portion. The covering element is deformably disposed on the central connecting portion. When the covering element is deformed to a first shape, the drain holes are covered by the covering element, and when the covering element is deformed to a second shape, the drain holes are connected to an inner space of the container.

According to another aspect of the present disclosure, a lid structure for preparing a beverage, which is used for covering an opening of a container, includes a mainbody, an elastic annular element, a covering assembly and a beverage preparing element. The mainbody includes a through hole. The elastic annular element is integrally disposed on a peripheral region of the mainbody, wherein the elastic annular element is used for positioning the lid structure for preparing the beverage on the opening. The covering assembly is disposed on the mainbody and includes a spacer element, a covering element, a first pulling rod and a second pulling rod. The spacer element is disposed on and covers the through hole, wherein the spacer element includes a plurality of drain holes and a central opening. The covering element is deformably disposed on one side of the spacer element, wherein the covering element includes a first surface and a second surface. One end of the first pulling rod is disposed on the first surface. One end of the second pulling rod passes through the central opening and then is connected to the second surface. The beverage preparing element is detachably disposed on the mainbody and covers the covering assembly. When the covering element is pulled by the first pulling rod and deformed to a first shape, the drain holes are covered by the covering element, and when the covering element is pulled by the second pulling rod and deformed to a second shape, the drain holes are connected to an inner space of the container.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
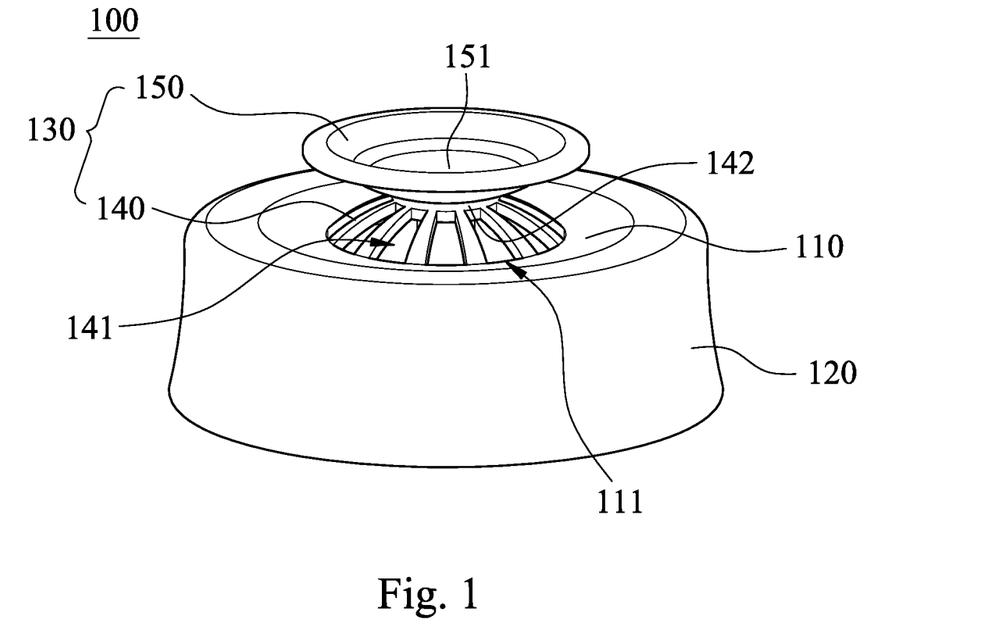
FIG. 1 is a schematic view of a lid structure according to one embodiment of the present disclosure.
Figure 2:
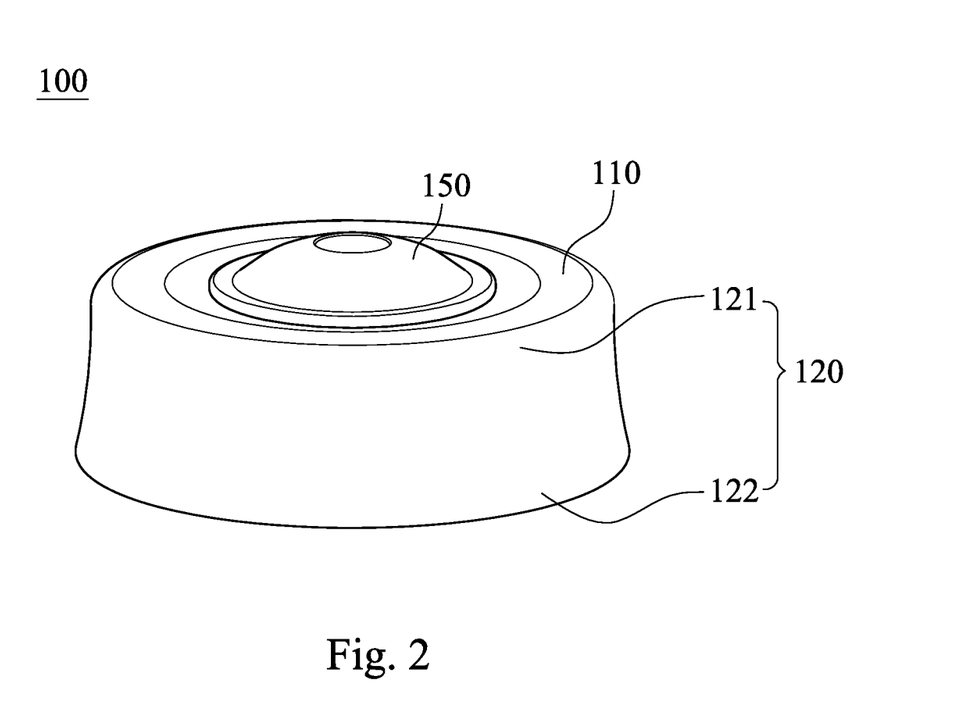
FIG. 2 is another schematic view of the lid structure of FIG. 1.

Please refer to FIG. 1 and FIG. 2. FIG. 1 is a schematic view of a lid structure 100 according to one embodiment of the present disclosure. FIG. 2 is another schematic view of the lid structure 100 of FIG. 1. The lid structure 100 is used for covering an opening (not shown) of a container (not shown), and the lid structure 100 includes a mainbody 110, an elastic annular element 120 and a covering assembly 130.

The mainbody 110 includes a through hole 111. The elastic annular element 120 is integrally disposed on a peripheral region of the mainbody 110, and the elastic annular element 120 is used for positioning the lid structure 100 on the opening of the container. Furthermore, in the embodiment of FIG. 1 and FIG. 2, the elastic annular element 120 includes an annular connecting portion 121 and a skirt portion 122, and the annular connecting portion 121 is connected to the peripheral region of the mainbody 110. In detail, when the lid structure 100 is used for covering the opening of the container, the skirt portion 122 of the elastic annular element 120 may be stretched by an external force and placed on the container. After the external force applied on the elastic annular element 120 is removed, the elastic annular element 120 may be further retracted and tightly wrapped around an outer wall of the container. Accordingly, the mainbody 110 may be positioned on the opening so as to seal the opening completely, so that it is favorable for avoiding the shift of the mainbody 110 and then preventing the liquids or articles accommodated in the container from falling or spilling. Therefore, the lid structure 100 of the present disclosure can be more convenient to use. Furthermore, because the elastic annular element 120 has elasticity, the elastic annular element 120 can be stretched by an external force according to actual needs and then can be placed on the containers with different opening sizes. Therefore, the application breadth of the lid structure 100 of the present disclosure can be further enhanced. Moreover, the lid structure 100 also can be positioned on the opening of the container by stuffing the skirt portion 122 of the elastic annular element 120 into an inner space of the container However, the present disclosure is not limited thereto.

The covering assembly 130 is disposed on the mainbody 110, and the covering assembly 130 includes a spacer element 140 and a covering element 150. The spacer element 140 is disposed on and covers the through hole 111, wherein the spacer element 140 includes in plurality of drain holes 141 and a central connecting portion 142. The covering element 150 is deformably disposed on the central connecting portion 142. Furthermore, in the embodiment of FIG. 1, the covering element 150 includes a central portion 151, and the central portion 151 is correspondingly connected to the central connecting portion 142. The drain holes 141 can be disposed side by side and spaced apart from each other, and the drain holes 141 surround the central connecting portion 142 so as to facilitate the flow of liquid. When the covering element 150 is deformed and forms a first shape, the drain holes 141 are covered by the covering element 150, and when the covering element 150 is deformed and forms a second shape, the drain holes 141 are connected to an inner space of the container.

In detail, FIG. 1 is a schematic view of the covering element 150 of the lid structure 100 deformed and forming the second shape, and FIG. 2 is a schematic view of the covering element 150 of the lid structure 100 deformed and forming the first shape. As shown in FIG. 1, when the covering element 150 is deformed and forms the second shape, the drain holes 141 are connected to the inner space of the container, so that the liquid in the container can be released from the inner space through the drain holes 141. As shown in FIG. 2, when the covering element 150 is deformed and forms the first shape, the spacer element 140 is covered by the covering element 150 completely. At this time, the container is completely sealed by the lid structure 100 so as to prevent the liquid in the container from leaking out due to shaking or vibration. Furthermore, in the embodiment of FIG. 2, the first shape can be hollow semi-spherical shaped so as to enhance the covering efficiency of the covering element 150 to the spacer element 140. Thus, by adjusting the shape of the covering element 150 of the lid structure 100 of the present disclosure to be the first shape or the second shape, the connection between the external space and the inner space of the container can be controlled. Therefore, the liquid accommodated in the container can be released under the premise that the lid structure 100 of the present disclosure and the container are connected together, so that the lid structure 100 of the present disclosure can be more convenient to use, and the application breadth thereof can be further enhanced.

Figure 3:
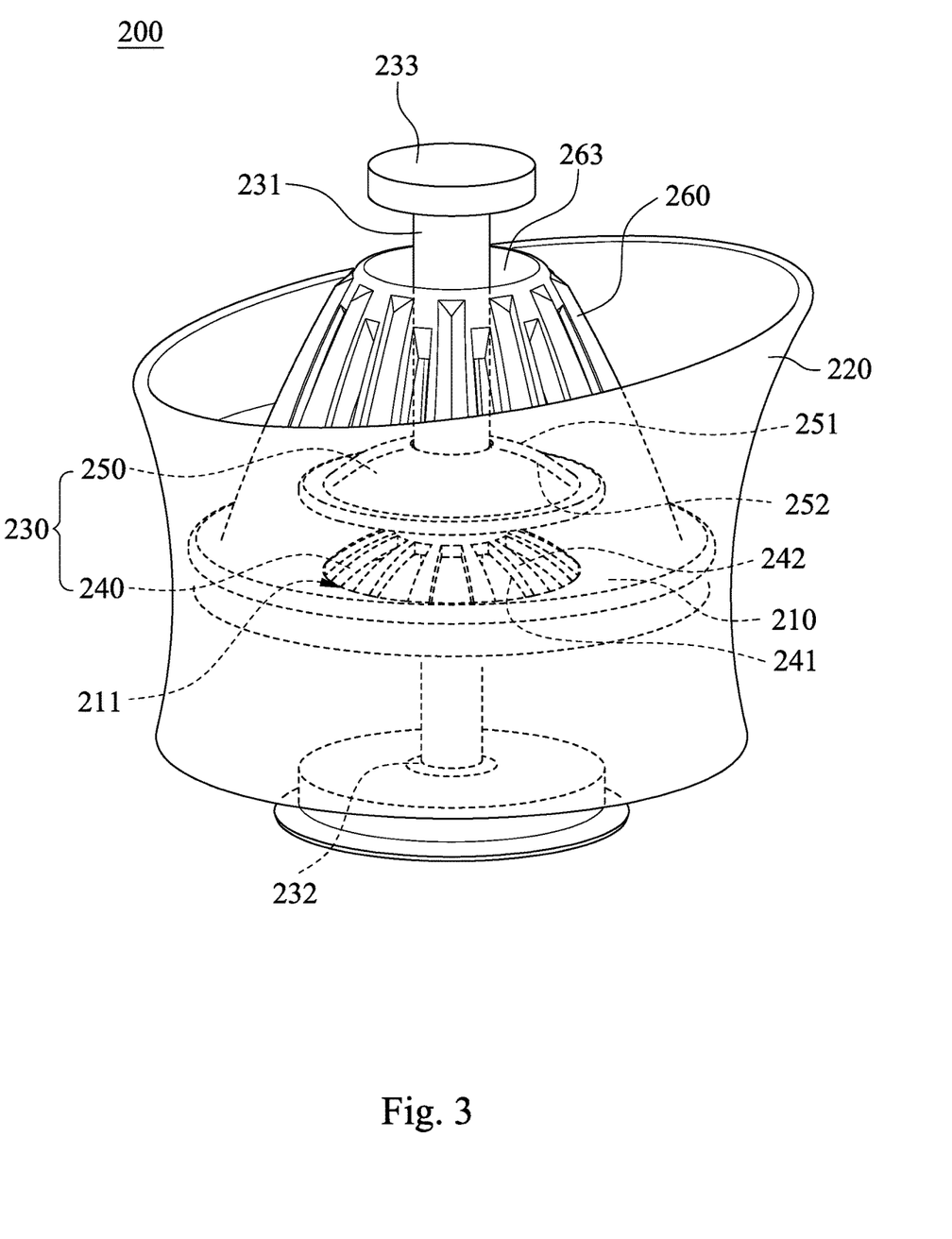
FIG. 3 is a schematic view of a lid structure for preparing a beverage according to another embodiment of the present disclosure.
Figure 4:
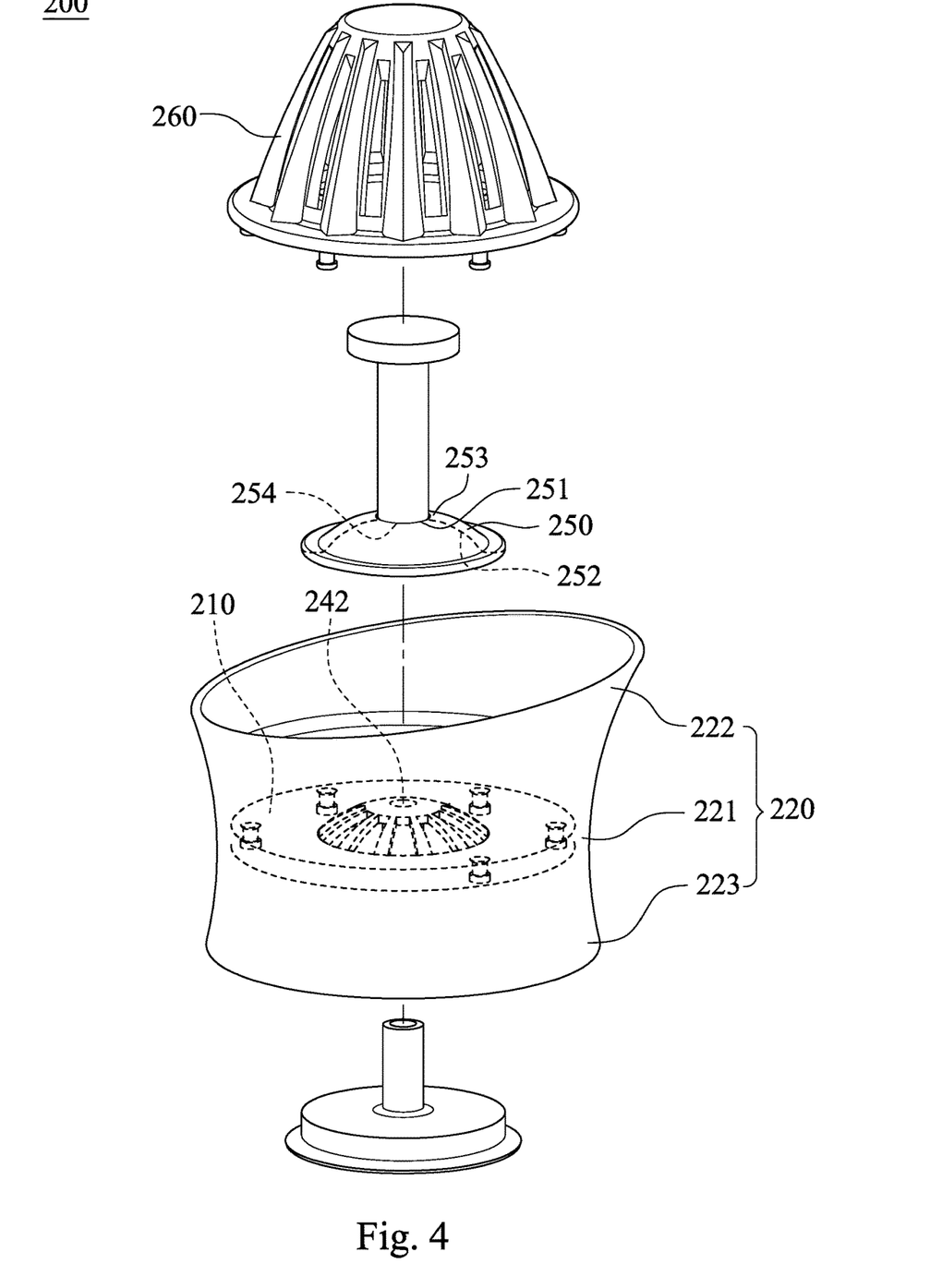
FIG. 4 is an exploded view of the lid structure for preparing the beverage of FIG. 3.

Please refer to FIG. 3 and FIG. 4. FIG. 3 is a schematic view of a lid structure 200 for preparing a beverage according to another embodiment of the present disclosure. FIG. 4 is an exploded view of the lid structure 200 for preparing the beverage of FIG. 3. The lid structure 200 for preparing the beverage is used for covering an opening (not shown) of a container (not shown), and the lid structure 200 for preparing the beverage includes a mainbody 210, an elastic annular element 220, a covering assembly 230 and a beverage preparing element 260.

The mainbody 210 includes a through hole 211. The elastic annular element 220 is integrally disposed on a peripheral region of the mainbody 210, wherein the elastic annular element 220 is used for positioning the lid structure 200 for preparing the beverage on the opening. Furthermore, in the embodiment of FIG. 3 and FIG. 4, the elastic annular element 220 includes an annular connecting portion 221, a first skirt portion 222 and a second skirt portion 223. The first skirt portion 222 and the second skirt portion 223 are disposed on two side portions of the annular connecting portion 221, respectively, and the annular connecting portion 221 is connected to the peripheral region of the mainbody 210. In detail, when the lid structure 200 for preparing the beverage is used for covering the opening of the container, the first skirt portion 222 or the second skirt portion 223 of the elastic annular element 220 may be stretched by an external force and placed on the container. After the external force applied on the elastic annular element 220 is removed, the elastic annular element 220 may be further retracted and tightly wrapped around an outer wall of the container. Accordingly, the mainbody 210 may be positioned on the opening so as to seal the opening completely, so that it is favorable for avoiding the shift of the mainbody 210 and then preventing the liquids or articles accommodated in the container from falling or spilling. Therefore, the lid structure 200 for preparing the beverage can be more convenient to use and can be placed on the containers with different opening sizes. Furthermore, the lid structure 200 for preparing the beverage also can be positioned on the opening of the container by stuffing the first skirt portion 222 or the second skirt portion 223 of the elastic annular element 220 into an inner space of the container. However, the present disclosure is not limited thereto.

Furthermore, in the embodiment of FIG. 3 and FIG. 4, the perimeter of the first skirt portion 222 is not equal to the perimeter of the second skirt portion 223, and the sway-skirt type of the first skirt portion 222 and the sway-skirt type of the second skirt portion 223 are different. Accordingly, when the lid structure 200 for preparing the beverage is used for covering the opening of the container, the first skirt portion 222 and the second skirt portion 223 can be arranged asymmetrically and can be used as a spout thereof so as to facilitate releasing the liquid in the container. Therefore, the using convenience of the lid structure 200 for preparing the beverage of the present disclosure can be further enhanced.

The covering assembly 230 is disposed on the mainbody 210, and the covering assembly 230 includes a spacer element 240, a covering element 250, a first pulling rod 231 and a second pulling rod 232. The spacer element 240 is disposed on and covers the through hole 211, wherein the spacer element 240 includes a plurality of drain holes 241 and a central opening 242 (reference number is shown in FIG. 4). The covering element 250 is deformably disposed on one side of the spacer element 240, and the covering element 250 includes a first surface 251 and a second surface 252. One end of the first pulling rod 231 is connected to the first surface 251. One end of the second pulling rod 232 passes through the central opening 242 and then is connected to the second surface 252. When the covering element 250 is pulled by the first pulling rod 231 and then deformed and forms a first shape, the drain holes 241 are covered by the covering element 250. When the covering element 250 is pulled by the second pulling rod 232 and then deformed and forms a second shape, the drain holes 241 are connected to an inner space of the container. In specific, because the first pulling rod 231 and the second pulling rod 232 are respectively connected to the first surface 251 and the second surface 252 of the covering element 250, the second pulling rod 232 may be displaced by the traction of the covering element 250 and then change its position corresponding to the covering element 250 when the covering element 250 is deformed along with the pulling of the first pulling rod 231. On the other hand, when the second pulling rod 232 is pulled and returns back to the position before being pulled by the first pulling rod 231, the first pulling rod 231 may be also displaced by the traction of the covering element 250. Thus, the shape of the covering element 250 of the lid structure 200 for preparing the beverage of the present disclosure can transform between the first shape and the second shape by pulling the first pulling rod 231 and the second pulling rod 232 so as to control the connection between the external space and the inner space of the container. Therefore, the liquid accommodated in the container can be released under the premise that the lid structure 200 for preparing the beverage of the present disclosure and the container are connected together, so that the lid structure 200 for preparing the beverage of the present disclosure can be more convenient to use.

Furthermore, in the embodiment of FIG. 3 and FIG. 4, the drain holes 241 can be disposed side by side and spaced apart from each other, and the drain holes 241 surround the central opening 242 so as to facilitate the flow of liquid. Moreover, the first surface 251 can include a first central portion 253, the second surface 252 can include a second central portion 254, and the end of the first pulling rod 231 is connected to the first central portion 253, and the end of the second pulling rod 232 is connected to the second central portion 254 so as to enhance the deformation efficiency of the covering element 250 along with the pulling of the first pulling rod 231 and the second pulling rod 232.

The beverage preparing element 260 is detachably disposed on the mainbody 210 and covers the covering assembly 230. In detail, in the embodiment of FIG. 3, the beverage preparing element 260 can be an extrusion cone, so that the lid structure 200 for preparing the beverage of the present disclosure can be used for juicing and preparing juice beverage s so as to enhance the application breadth of the lid structure 200 for preparing the beverage.

Figure 5:
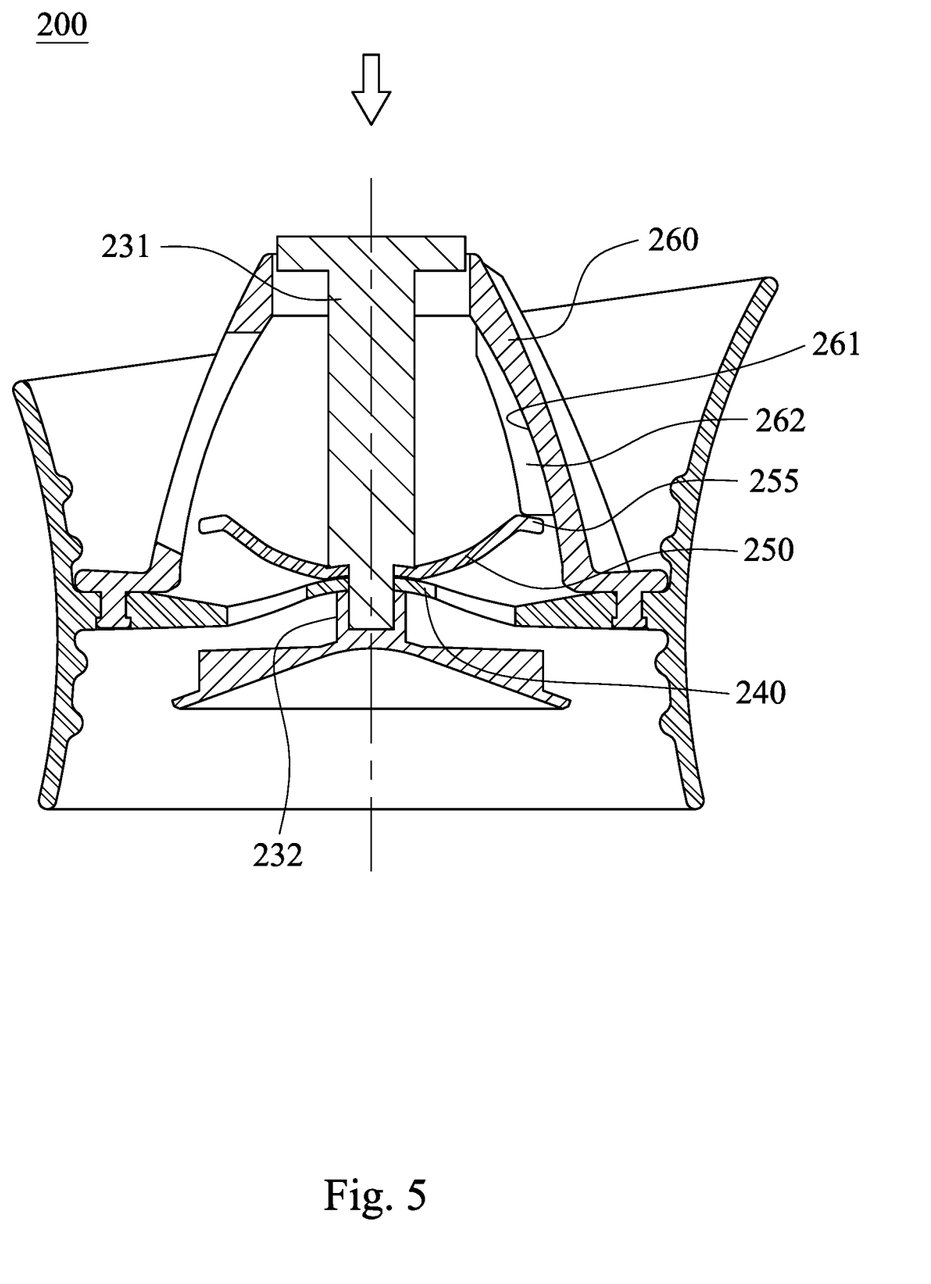
FIG. 5 is a cross-sectional view of a first status of the lid structure for preparing the beverage of FIG. 3.
Figure 6:
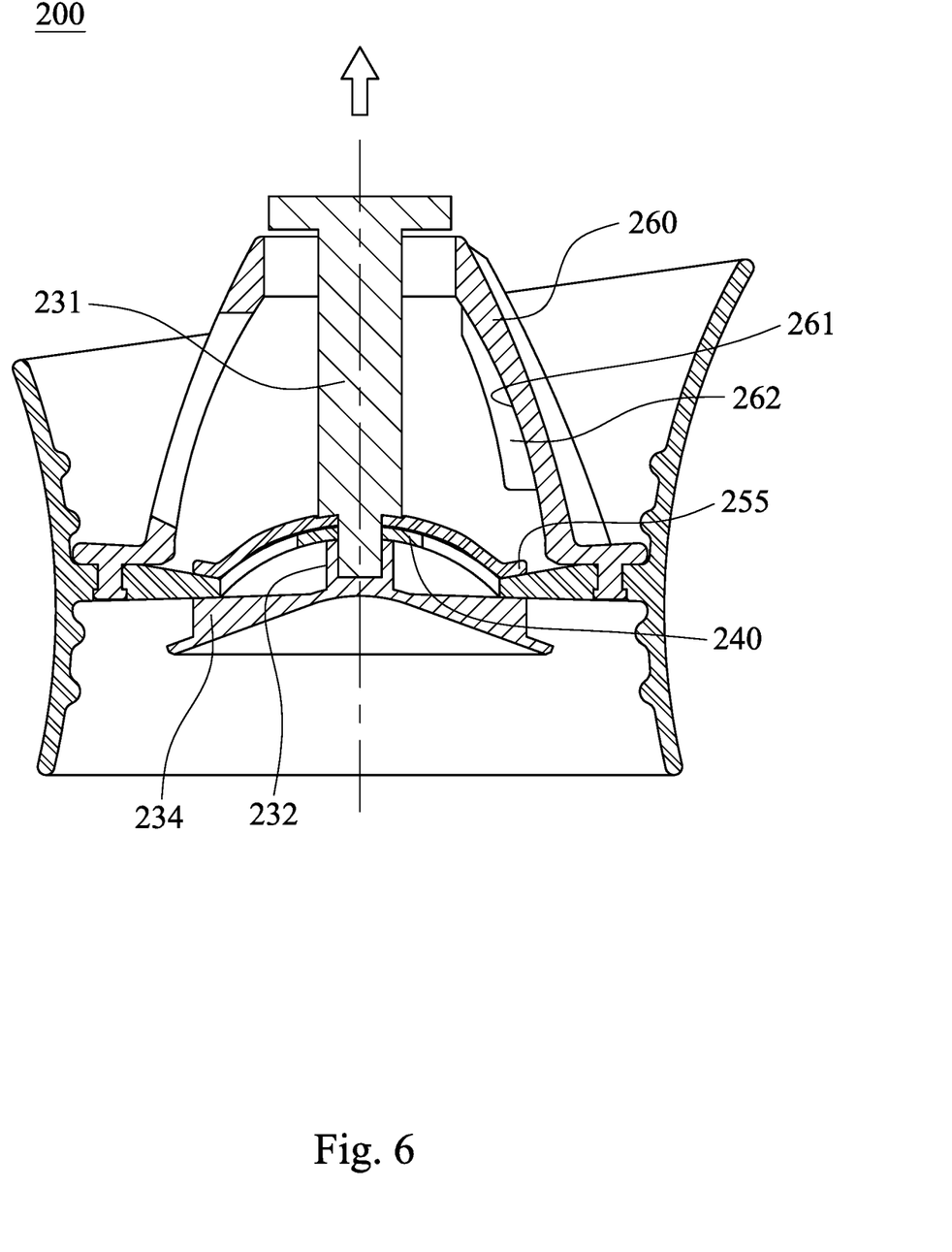
FIG. 6 is a cross-sectional view of a second status of the lid structure for preparing the beverage of FIG. 3.

Please refer to FIG. 5 and FIG. 6. FIG. 5 is a cross-sectional view of a using status of the lid structure 200 for preparing the beverage of FIG. 3. FIG. 6 is another cross-sectional view of the using status of the lid structure 200 for preparing the beverage of FIG. 3. In detail, FIG. 5 is a schematic view of the covering element 250 of the lid structure 200 for preparing the beverage deformed and forming the second shape, and FIG. 6 is a schematic view of the covering element 250 of the lid structure 200 for preparing the beverage deformed and forming the first shape.

As shown in FIG. 5, the beverage preparing element 260 being the extrusion cone includes an inner-cone surface 261 and a plurality of ribs 262. The ribs 262 are spaced apart from each other and disposed on the inner-cone surface 261. When the covering element 250 is pulled by the second pulling rod 232 and then deformed and forms the second shape, the drain holes 241 are connected to the inner space of the container, so that the liquid in the container can be released from the inner space through the drain holes 241. In detail, when the covering element 250 is pulled by the second pulling rod 232, the second central portion 254 of the covering element 250 may be deformed quickly by the pulling of the second pulling rod 232, so that the ends of each of the ribs 262 can be contacted to a peripheral area 255 of the covering element 250, and then the covering element 250 may be deformed and forms the second shape. As shown in FIG. 6, when the covering element 250 is pulled by the first pulling rod 231, the first central portion 253 of the covering element 250 may be replaced by the pulling of the first pulling rod 231, so that the covering element 250 may be deformed quickly, the peripheral area 255 may leave away from the ends of each of the ribs 262, and then the covering element 250 may be deformed and forms the first shape. At this time, the drain holes 241 may be covered by the covering element 250, and the through hole 211 may be further sealed by a second block member 234 disposed on another end of the second pulling rod 232. Accordingly, the container may be sealed completely by the lid structure 200 for preparing the beverage so as to prevent the liquid in the container from leaking out due to shaking or vibration. Furthermore, a perimeter of the covering element 250 can be greater than a perimeter of the spacer element 240, and a sagittal height of the covering element 250 can be greater than a sagittal height of the spacer element 240. Therefore, it is favorable for enhancing the tightness and integrity of the covering element 250 covered on the spacer element 240, so that the sealing efficiency of the lid structure 200 for preparing the beverage can be further enhanced.

Furthermore, in the embodiment of FIG. 3, the beverage preparing element 260 being the extrusion cone can further include a central through hole 263 for the first pulling rod 231 passing through, another end of the first pulling rod 231 can include a first block member 233, and a size of the first block member 233 can be greater than or equal to a size of the central through hole 263. Therefore, the position of the end of the first pulling rod 231 including the first block member 233 can be remained on the side of the central through hole 263 away from the covering assembly 230 so as to prevent the first pulling rod 231 from totally entering the beverage preparing element 260 and then affecting the using convenience of the lid structure 200 for preparing the beverage of the present disclosure.

Figure 7:
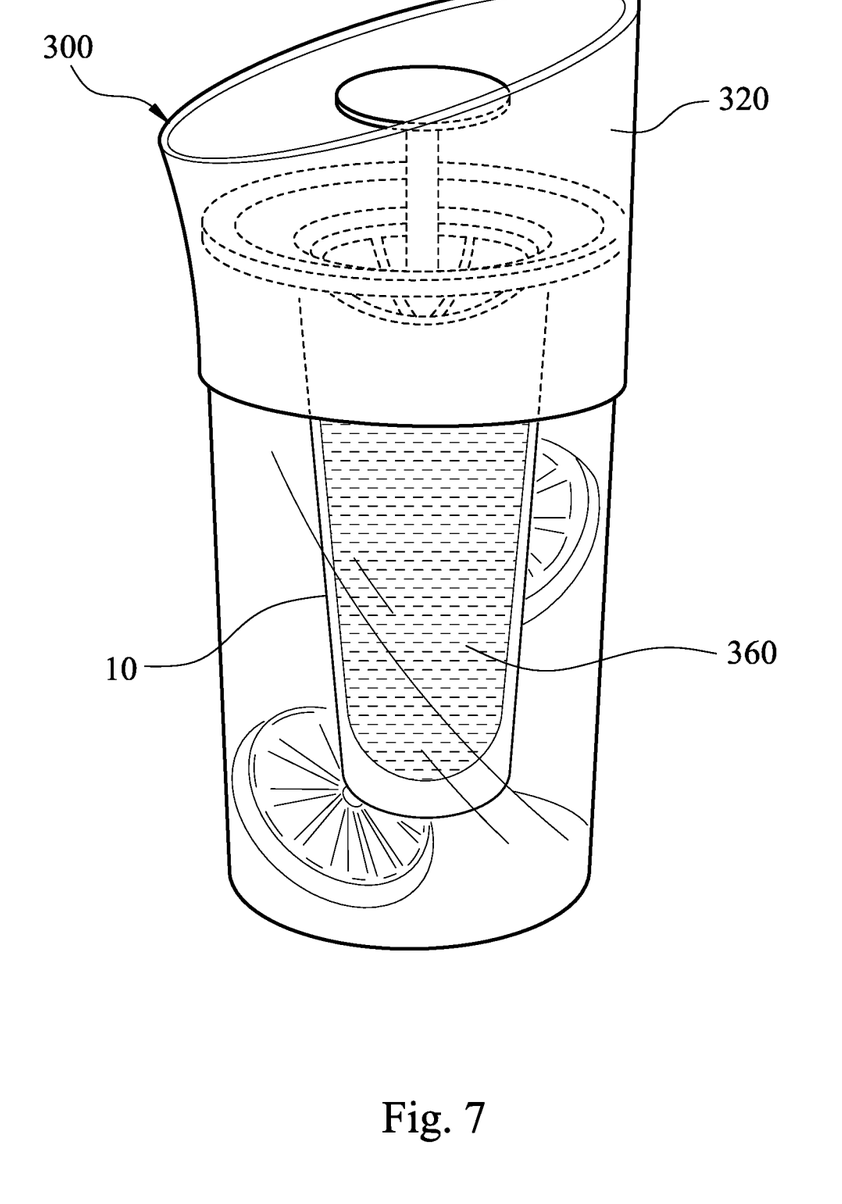
FIG. 7 is a schematic view of a lid structure for preparing a beverage according to another embodiment of the present disclosure.

Please refer to FIG. 7, which is a schematic view of a lid structure 300 for preparing a beverage according to further another embodiment of the present disclosure. The lid structure 300 for preparing the beverage is similar to the lid structure 200 for preparing the beverage of FIG. 3, so that the same structures and the details thereof will not be described again. As shown in FIG. 7, the lid structure 300 for preparing the beverage is disposed on a container 10 by an elastic annular element 320 thereof so as to seal an opening (not shown) of the container 10, wherein the beverage preparing element 360 is an ice cube tray. In detail, the beverage preparing element 360 being the ice cube tray can be filled with boiling water and then placed into the freezer so as to make the boiling water freeze and then forms ice cubes. Then, the beverage may be further poured into the container 10, so that the lid structure 300 for preparing the beverage of the present disclosure can be used in groups with the container 10 so as to prepare cool beverage without adding additional ice cubes. Therefore, the application of the lid structure 300 for preparing the beverage of the present disclosure can be further enhanced.

Figure 8:
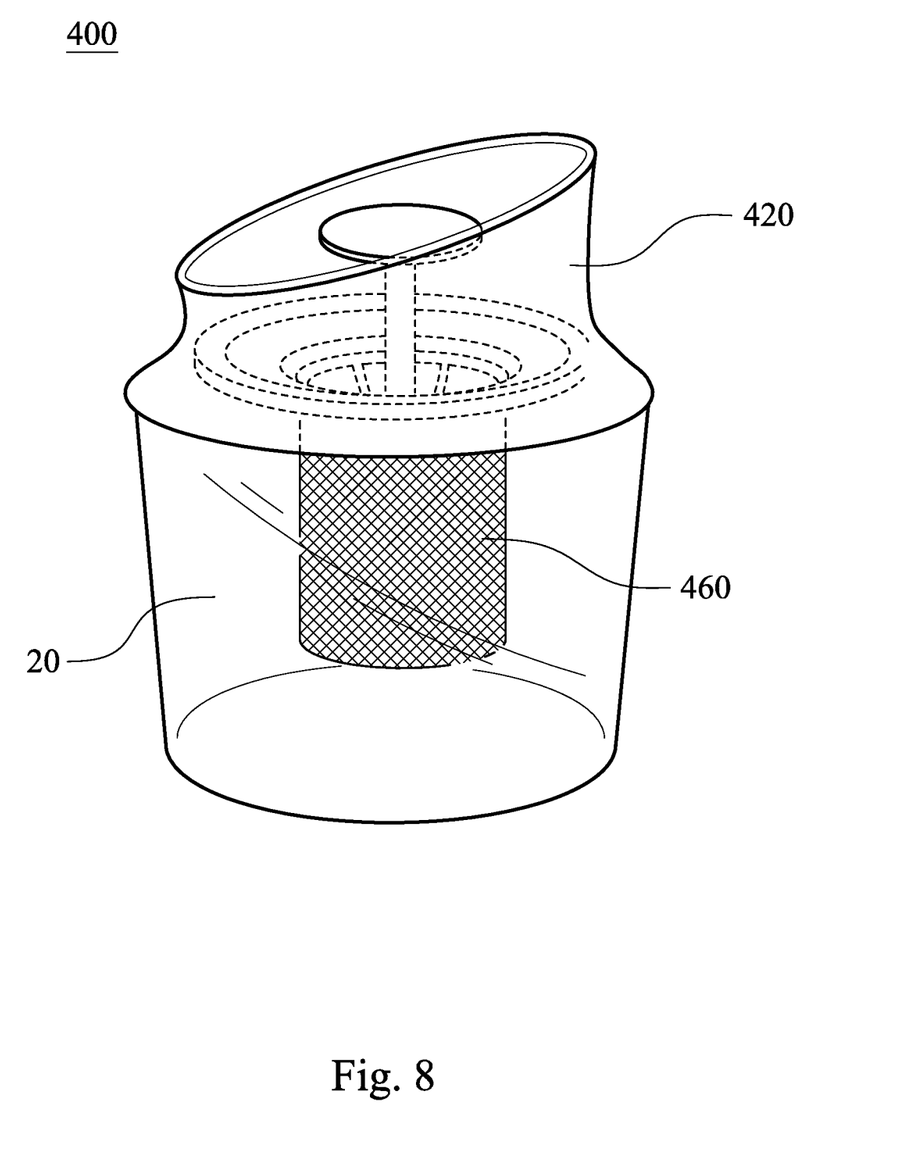
FIG. 8 is a schematic view of a lid structure for preparing a beverage according to still another embodiment of the present disclosure.

Please refer to FIG. 8, which is a schematic view of a lid structure 400 for preparing a beverage according to still another embodiment of the present disclosure. The lid structure 400 for preparing the beverage is similar to the lid structure 200 for preparing the beverage of FIG. 3, so that the same structures and the details thereof will not be described again. As shown in FIG. 8, the lid structure 400 for preparing the beverage is disposed on a container 20 by an elastic annular element 420 thereof so as to seal an opening (not shown) of the container 20. As shown in FIG. 8, the beverage preparing element 460 is a tea strainer so as to accommodate the tea leaves or other brewed beverages, and the tea or other brewed beverages may flow from the tiny holes of the tea strainer into the container 20 and then forms a beverage without the residue in the container 20. Thus, not only the lid structure 400 for preparing the beverage of the present disclosure can seal the container 20 effectively, but also can be used in groups with the container 20 so as to prepare tea or other beverages. Therefore, the application of the lid structure 400 for preparing the beverage of the present disclosure can be further enhanced.

Figure 9:
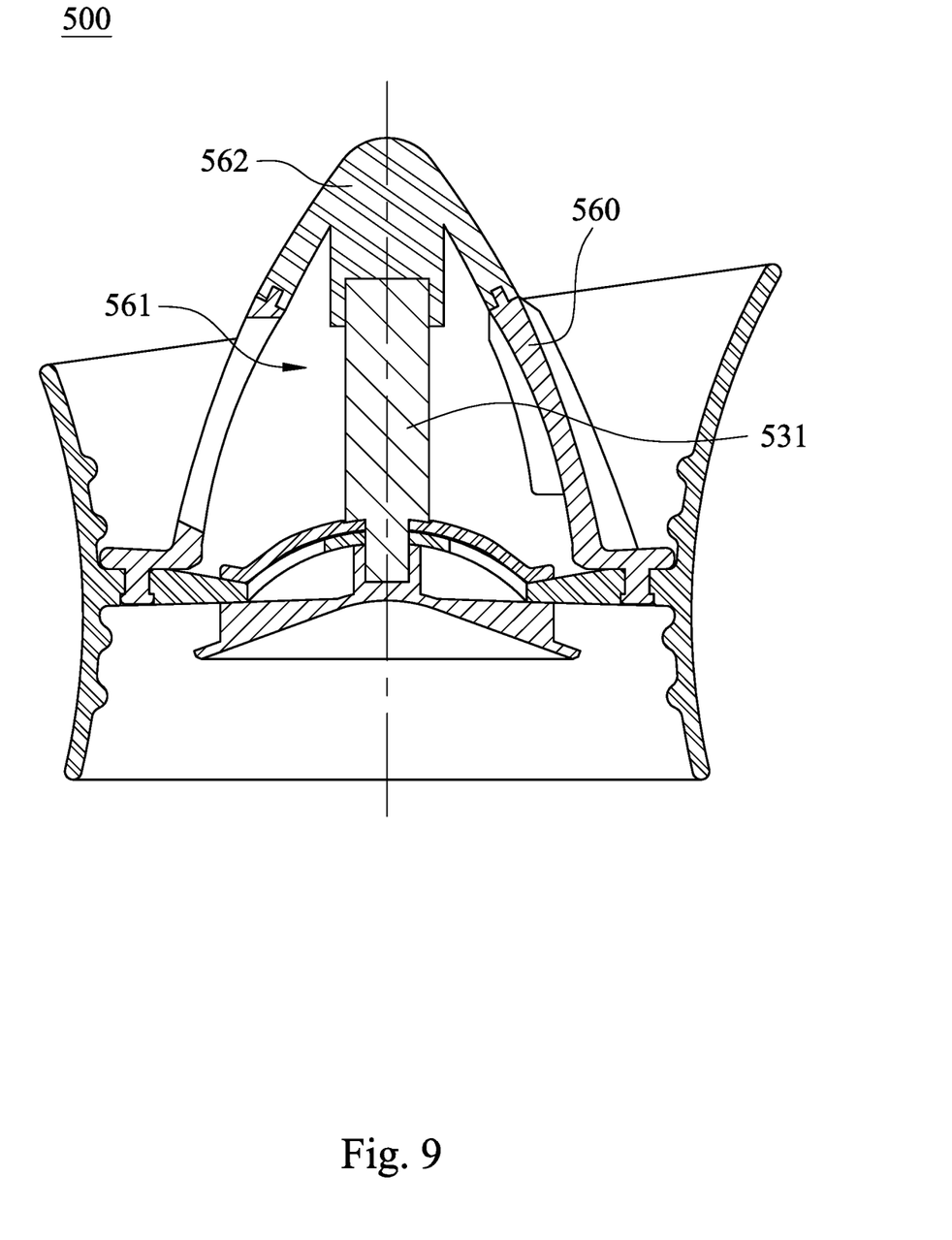
FIG. 9 is a schematic view of a lid structure for preparing a beverage according to yet another embodiment of the present disclosure.

Furthermore, please refer to FIG. 9, which is a schematic view of a lid structure 500 for preparing a beverage according to yet another embodiment of the present disclosure. The lid structure 500 for preparing the beverage of FIG. 9 is similar to the lid structure 200 for preparing the beverage of FIG. 3, so that the same structures and the details thereof will not be described again.

As shown in FIG. 9, a beverage preparing element 560 being an extrusion cone can further include a central through hole 561 and a partitioning membrane 562. The partitioning membrane 562 is disposed on and covers the central through hole 561, and another end of the first pulling rod 531 is connected to the partitioning membrane 562. Therefore, the deformation of the covering element 550 can be achieved by pressing the first pulling rod 531, but the present disclosure is not limited thereto. Furthermore, the partitioning membrane 562 can be made of a silicone material and can be integrally formed on the beverage preparing element 560 being the extrusion cone. The partitioning membrane 562 made of a silicone material has flexibility, so that it is favorable for operating by the user.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A lid structure for preparing a beverage, the lid structure being for covering an opening of a container and comprising:
    a mainbody comprising a through hole;
    an elastic annular element integrally disposed on a peripheral region of the mainbody, wherein the elastic annular element is configured for positioning the lid structure for preparing the beverage on the opening;
    a covering assembly disposed on the mainbody, the covering assembly comprising:
        a spacer element disposed on and covering the through hole, wherein the spacer element comprises a plurality of drain holes and a central opening;
        a covering element deformably disposed on one side of the spacer element, wherein the covering element comprises a first surface and a second surface;
        a first pulling rod, wherein one end of the first pulling rod is connected to the first surface; and
        a second pulling rod, wherein one end of the second pulling rod passes through the central opening and is connected to the second surface; and
    a beverage preparing element detachably disposed on the mainbody and covering the covering assembly;
    wherein when the covering element is pulled by the first pulling rod and deformed to a first shape, the drain holes are covered by the covering element, and when the covering element is pulled by the second pulling rod and deformed to a second shape, the drain holes are connected to an inner space of the container.

2. The lid structure of claim 1, wherein the drain holes are disposed side by side and spaced apart from each other, and the drain holes surround the central opening.

3. The lid structure of claim 2, wherein a perimeter of the covering element is greater than a perimeter of the spacer element, and a sagittal height of the covering element is greater than a sagittal height of the spacer element.

4. The lid structure of claim 1, wherein the first surface comprises a first central portion, the second surface comprises a second central portion, the end of the first pulling rod is connected to the first central portion, and the end of the second pulling rod is connected to the second central portion.

5. The lid structure of claim 1, wherein the elastic annular element comprises an annular connecting portion, a first skirt portion and a second skirt portion, the first skirt portion and the second skirt portion are disposed on two side portions of the annular connecting portion, respectively, and the annular connecting portion is connected to the peripheral region of the mainbody.

6. The lid structure of claim 1, wherein the beverage preparing element is an extrusion cone, and the extrusion cone comprises:
    an inner-cone surface; and
    a plurality of ribs spaced apart from each other and disposed on the inner-cone surface.

7. The lid structure of claim 6, wherein the extrusion cone further comprises a central through hole for allowing the first pulling rod to extend through, another end of the first pulling rod comprises a first block member, and a size of the first block member is greater than a size of the central through hole.

8. The lid structure of claim 6, wherein the extrusion cone further comprises:
    a central through hole; and a partitioning membrane disposed on and covering the central through hole, and another end of the first pulling rod is connected to the partitioning membrane.

9. The lid structure of claim 1, wherein the beverage preparing element is a tea strainer.

10. The lid structure of claim 1, wherein the beverage preparing element is an ice cube tray.

\* \* \* \* \*